United States Patent [19]
Lambiris

[11] 3,762,361
[45] Oct. 2, 1973

[54] SHIFT INDICATOR ARRANGEMENT
[75] Inventor: Theodore Lambiris, Walled Lake, Mich.
[73] Assignee: General Motors Corporation, Detroit, Mich.
[22] Filed: Nov. 1, 1971
[21] Appl. No.: 194,128

[52] U.S. Cl. .............................. 116/124 R, 74/475
[51] Int. Cl. .............................................. G09f 9/00
[58] Field of Search ................. 116/124 R, DIG. 20; 29/428; 74/473, 475

[56] References Cited
UNITED STATES PATENTS
2,738,755  3/1956  Doane ............................... 116/124
2,762,906  9/1956  Wirges .............................. 116/124
3,242,900  3/1966  Howard ............................ 116/124

Primary Examiner—Louis J. Capozi
Attorney—Warren E. Finken

[57] ABSTRACT

The shift indicator assembly shown discloses a steering column-mounted one-piece molded polypropylene indicator housing including two generally arcuate shaped members connected by a flexible hinge joint. One member includes a window frame portion having a slot and three side grooves to accommodate the insertion therein of a tapered lens. The other narrower member has two counterbored openings in which are mounted a pair of screws. Confinement of the screw heads, as well as the lens, occurs after the narrower member is mounted on the steering column, the screws threadedly secured to the steering column, and the wider member folded onto the other member, there being tabs and a rib formed on the latter member to "snap" into openings and past a ridge, respectively, formed on the outer member. An opening is formed on an end portion of the lens to accommodate a fiber optic light tube. A series of steps or ridges, also formed on the end portion of the lens, serves to direct the light from the end of the tube across the lens, whereupon the tapered shape of the lens causes the light to be observed through the window at a substantially constant intensity. The manually rotatable shift bowl shroud and integral pointer are located directly behind the housing, on the side away from the operator, selectively indicating through the window the various P-R-N-D-S and L indicia formed on the lens.

6 Claims, 10 Drawing Figures

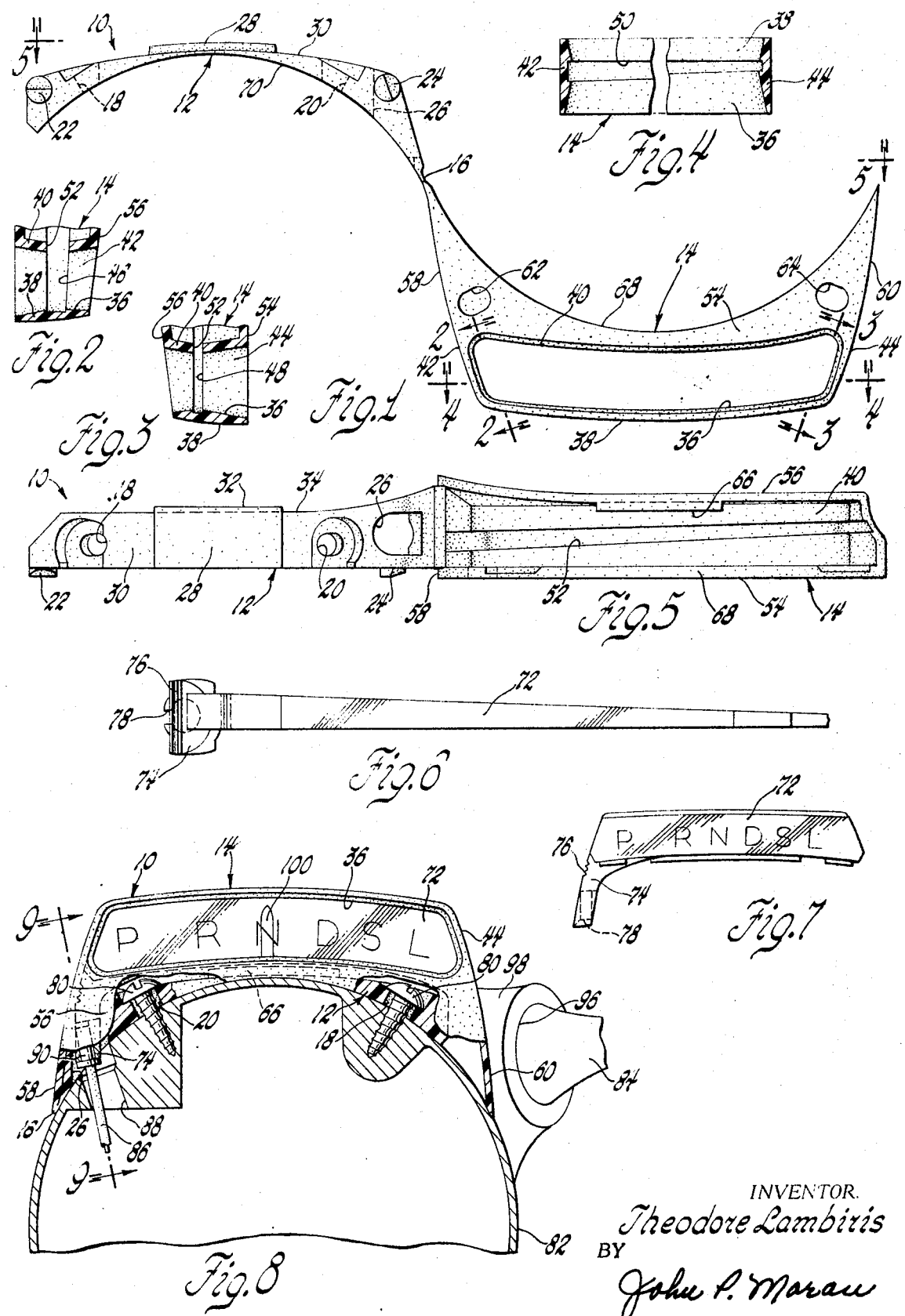

INVENTOR.
*Theodore Lambiris*
BY
*John P. Moran*
ATTORNEY

SHIFT INDICATOR ARRANGEMENT

This invention relates to shift indicator mechanisms adaptable for mounting on the steering column of a vehicle.

An object of the invention is to provide a simplified, economical, and readily manufactured and assembled shift indicator housing, including provisions for an efficiently lighted lens arrangement.

Another object of the invention is to provide an improved shift indicator mechanism wherein the housing is a molded one-piece polypropylene housing having first and second cooperating portions interconnected by an integrally molded flexible hinge, the first portion being adapted to contain and display a lighted lens arrangement and the second portion being adapted to fit within and connect with the first portion to retain the lens arrangement therein and to be connected to a vehicle steering column.

A further object of the invention is to provide such a housing and lighted lens arrangement, wherein provisions are formed on the lens to receive light rays from a light source and direct same across the lens such that it is of substantially constant intensity at all locations thereon.

These and other objects and advantages of the invention will be apparent when reference is made to the following description and accompanying drawings, wherein:

FIG. 1 is a side view in partial cross-section of a component embodied in the invention;

FIGS. 2-4 are cross-sectional views taken along the respective planes of the lines 2—2, 3—3, and 4—4 of FIG. 1, and looking in the directions of the arrows;

FIG. 5 is a top view taken along the plane of the line 5—5 of FIG. 1, and looking in the direction of the arrows;

FIG. 6 is an enlarged top view of a component embodied in the invention;

FIG. 7 is a reduced side view of the FIG. 6 component;

FIG. 8 is a cross-sectional view of a steering column embodying the invention;

Figure 9:
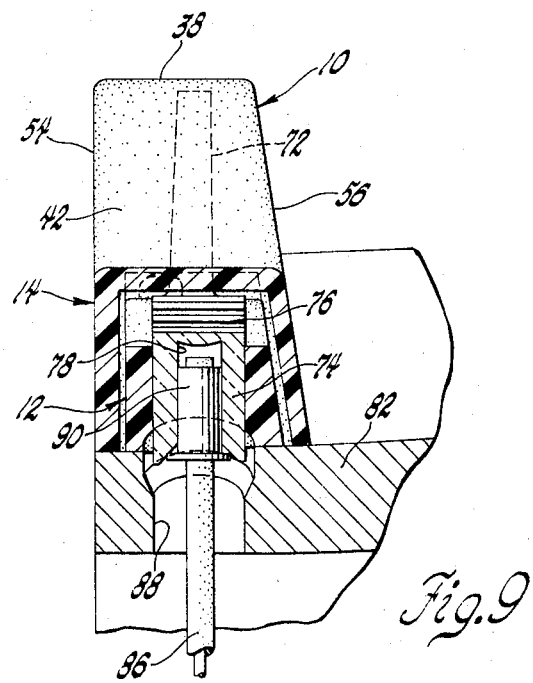
FIG. 9 is an enlarged cross-sectional view taken along the plane of line 9—9 of FIG. 8, and looking in the direction of the arrows.

Referring now to the drawings in greater detail, FIGS. 1-5 illustrate a one-piece molded polypropylene shift indicator housing 10 having two generally arcuate-shaped components 12 and 14 connected together by a flexible strip or so-called "live" hinge joint 16. A pair of slanted counterbored openings 18 and 20 are formed adjacent the ends of the arcuate component 12. A pair of projecting tabs or snaps 22 and 24 are formed on the arcuate component 12 outwardly of the openings 18 and 20, respectively, adjacent the outermost edges of the component 12. A further, substantially vertical (FIG. 1) opening 26 is formed in the component 12 intermediate the opening 20 and the hinge 16. An arcuate rib 28 is formed at an intermediate location on the outer surface 30 of the component 12, with an edge 32 (FIG. 5) thereof protruding past the side 34 of the component 12.

The arcuate component 14 is formed to include a window frame portion 36 having parallel top and bottom walls 38 and 40, respectively, with diverging end walls 42 and 44. Respective wide and narrow tapered grooves 46 and 48 (FIGS. 2 and 3, respectively,) are formed along the inner surfaces of the end walls 42 and 44, respectively. A tapered groove 50 (FIG. 4) is formed along the inner surface of the wall 38, interconnecting the narrower ends of the tapered grooves 46 and 48. A tapered slot 52 (FIG. 5) is formed through the wall 40 interconnecting the wider ends of the tapered grooves 46 and 48. A front arcuate-edged wall 54 extends from the front face of the window frame 36, while a back arcuate-shaped wall 56 extends from the back face of the window frame 36. End walls 58 and 60 are formed as continuations of the diverging end walls 42 and 44 between the front and back walls 54 and 56, respectively, the walls 54, 56, 58, and 60 serving substantially as a skirt portion whose inner periphery is slightly larger than the outer periphery of the component 12. A pair of oval-shaped openings 62 and 64 are formed in the front wall 54 adjacent the end walls 58 and 60, respectively, the distance therebetween being the same as that between the tabs or snaps 22 and 24 formed on the component 12. A ridge 66 is formed on the inner surface of the back wall 56 adjacent the wall 40. The arcuate-shaped bottom edge 68 of the front wall 54 coincides with the arcuate-shaped bottom surface 70 of the component 12.

FIGS. 6 and 7 illustrate a wedge-shaped clear plexiglass lens 72 whose shape coincides with the overall shape of the grooves 46, 50, and 48 and the slot 52, the lens 72 being slidably insertable through the slot 52. A leg portion 74 is formed adjacent the wider end of the lens 72. A plurality of steps or ridges 76 are formed on the side of the leg portion 74, and an opening 78 is formed in the end face thereof. The usual shift ratio indicia "P," "R," "N," "D," "S," and "L" are formed on a face of the lens 72.

Once the lens 72 has been inserted through the slot 52 and into place in the grooves 46, 48, and 50, a pair of screws 80 are inserted in the counterbored openings 18 and 20 of the arcuate component 12, and the latter is threadedly secured to a steering column assembly 82 (FIG. 8). The component 14 is then pivoted about the hinge 16 in a counterclockwise direction in FIG. 1, until its walls 54, 56, 58, and 60 surround the arcuate component 12 and confine both the lens 72 mounted in the slot 52 and the screwheads in the counterbored openings 18 and 20. At this point the rib 32 snaps past the ridge 66 and the tabs 22 and 24 snap into the respective oval openings 62 and 64 to both effectively retain the lens 72 and align the arcuate surfaces 70 and 68 on and across the steering column assembly 82 (FIG. 8) adjacent the shift lever 84.

As illustrated in FIGS. 8 and 9, a fiber optic light tube 86 extending from a light source (not shown) is extended through an opening 88 formed in the steering column assembly 82 and mounted in the opening 78 formed in the leg portion 74 of the lens 72, and is held in place therein by a tight fitting retainer member 90. The ridges 76 serve to direct the light from the end of the tube 86 across the length of the lens 72, while the wedge shape of the lens 72 produces a substantially constant intensity of the light being directed thereacross, as observed through the window frame 36, thus compensating for the side position of the optic light tube 86.

Figure 10:
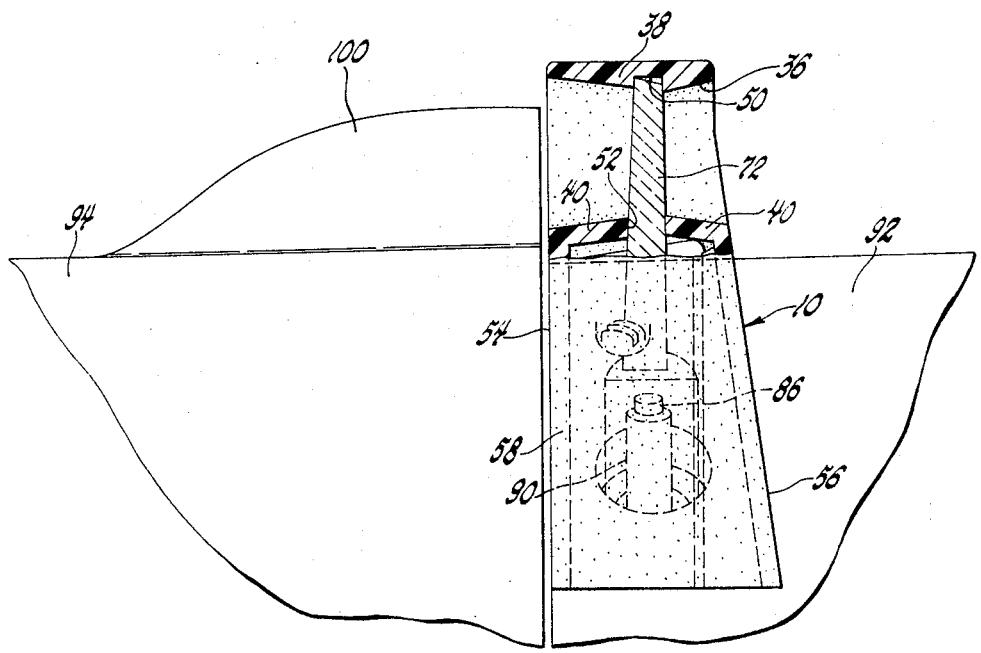
FIG. 10 is a fragmentary cross-sectional view of the shift indicator housing assembly embodied in the invention in its operative location intermediate the fixed steering column shroud and the rotatable shift bowl shroud.

As shown in FIG. 10, the shift indicator housing 10 is located intermediate the usual fixed steering column shroud 92 and the shift bowl shroud 94 which is rotatable in response to manual movement of the shift lever 84 (FIG. 8), the latter extending through an opening 96 formed in a boss 98 formed on the shroud 94. A point 100 (shown in a substantially central or neutral position in FIG. 8) is formed on the shift bowl shroud 94 in a sturdy fin-like shape (FIG. 10), arcing downwardly until it blends into the outer surface of the shroud 94.

It should be apparent that the invention provides an improved, economical and readily assembled shift indicator arrangement, with provisions for substantially constant lighting facilities.

While but one embodiment of the invention has been shown and described, other modifications thereof are possible.

I claim:

1. A shift indicator assembly adaptable for mounting on the steering column of a vehicle, said shift indicator mechanism comprising a housing, said housing including a window frame portion having three grooved sides and one slotted side, a skirt portion extending from said slotted side, first fastener means formed on the inner surface of said skirt, a connector portion having an outer periphery slightly smaller than the inner periphery of said skirt portion, second fastener means formed on the outer surface of said connector portion, mounting means formed on said connector portion suitable for the insertion of separate fasteners for connection to said steering column, and a flexible hinge interconnecting an edge of said skirt portion and an edge of said connector portion adapted to permit the pivotting of said connector portion about said flexible hinge into said skirt portion, said first fastener means connecting with said second fastener means.

2. A shift indicator assembly adaptable for mounting on the steering column of a vehicle, said shift indicator mechanism comprising a housing, said housing including a window frame portion having first, second and third tapered grooves formed in series on the inner surfaces thereof, said second tapered groove being narrower than said first tapered groove and said third tapered groove being narrower than said second tapered groove, and a tapered slot formed through the bottom surface thereof, a skirt portion formed on said window frame portion below said bottom surface, at least one opening formed in said skirt portion, a ridge formed on an inner surface of said skirt portion, a retention portion having a width slightly smaller than the opening of said skirt portion and including counterbored openings formed therethrough each suitable for the mounting therein of a metal screw adapted for threaded attachment to said steering column, at least one tab formed on one side thereof suitable for insertion in said at least one opening, and a rib formed on an edge thereof suitable for being snapped past said ridge; and an integral flexible hinge interconnecting said skirt portion and said retention portion at respective edges thereof.

3. The shift indicator assembly described in claim 2, and a tapered lens adapted to be inserted through said slot and mounted in said first, second and third grooves in said slot at the respective edges thereof, and a plurality of transmission indicia disposed thereon.

4. A shift indicator assembly adaptable for mounting on the steering column of a vehicle, said shift indicator mechanism comprising a housing, said housing including a window frame portion having top, bottom and side walls, front, back and side walls extending from the front and rear edges of said bottom wall and terminating in edges having an arcuate shape conforming to the outer surface of said steering column, a first tapered groove formed along the inner surface of one of said side walls, a second narrower tapered groove formed along the inner surface of the other of said side walls, said second tapered groove being narrower than said first tapered groove, a third intermediate width tapered groove formed along the inner surface of said top wall, said third tapered groove connecting the narrower ends of said first and second tapered grooves, and a tapered slot formed through said bottom wall along the length thereof, at least one opening formed in one of said front and back walls, and a ridge formed on an inner surface of one of said front and back walls; a tapered lens adapted for insertion through said tapered slot and into said tapered grooves; a retention portion having a width slightly smaller than the opening between said front, back and side walls and an arcuate outer surface conforming to said outer surface of said steering column, and including counterbored opening formed therethrough each suitable for the mounting therein of a metal screw adapted for threaded attachment to said steering column, at least one tab formed on one side thereof suitable for insertion in said at least one opening, and a rib formed on an edge thereof suitable for being snapped past said ridge, said tab and rib serving to retain said retention portion within said front, back and side walls; and a flexible hinge interconnecting an edge of said side walls and an edge of said retention portion.

5. The shift indicator assembly described in claim 4, and a plurality of spaced ridges formed on the thicker end of said tapered lens.

6. The shift indicator assembly described in claim 5, and an end portion formed on said thicker end of said tapered lens adjacent said plurality of spaced ridges, an opening formed in said end portion, a fiber optic light tube from a light source having an end portion thereof mounted in said opening, said plurality of spaced ridges serving to deflect the light from said end portion of said tube across said tapered lens, the taper thereof serving to cause said deflected light to have a substantially constant intensity as observed through said window frame portion, and an opening formed in said retention portion of said housing to accommodate the positioning therein of said end portion.

* * * * *